W. A. HOFFMAN.
APPARATUS FOR TREATING ORES.
APPLICATION FILED FEB. 4, 1914.
1,150,367.
Patented Aug. 17, 1915.
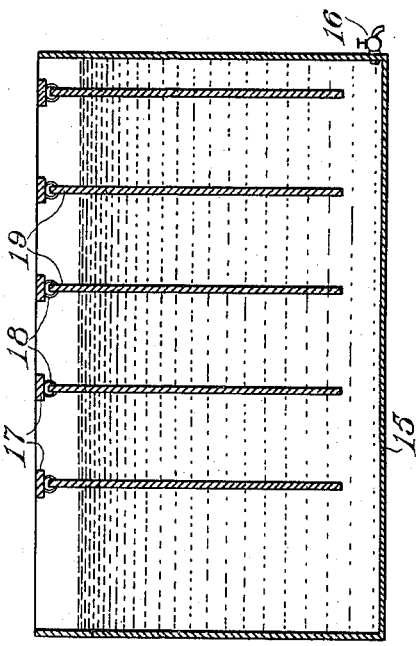
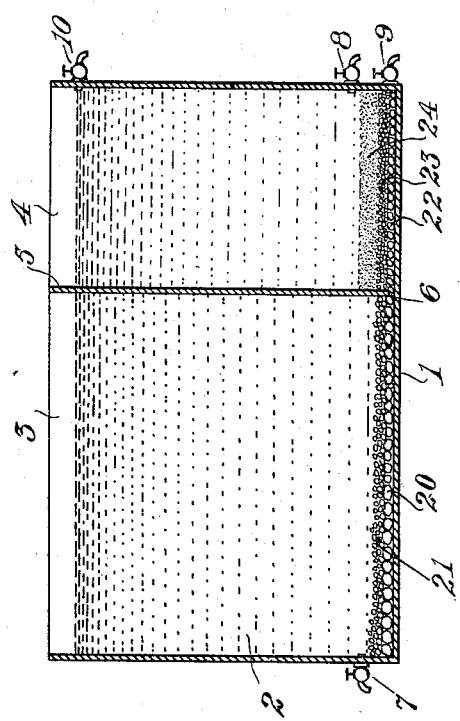
Inventor
William A. Hoffman.
By Victor J. Evans
Attorney
Witnesses
J. Stuart Freeman.

UNITED STATES PATENT OFFICE.

WILLIAM A. HOFFMAN, OF HAZLETON, PENNSYLVANIA.

APPARATUS FOR TREATING ORES.

1,150,367.

Specification of Letters Patent. Patented Aug. 17, 1915.

Application filed February 4, 1914. Serial No. 816,485.

*To all whom it may concern:*

Be it known that I, WILLIAM A. HOFFMAN, a citizen of the United States, residing at Hazleton, in the county of Luzerne and State of Pennsylvania, have invented new and useful Improvements in Apparatus for Treating Ores, of which the following is a specification.

This invention relates to the apparatus used in the treatment of ores and especially for extracting the metal, particularly copper, from its ore by a chemical process.

The object of the invention is to provide in an apparatus of this character a vessel suitably constructed and in which the ore is acted upon by a given chemical solution, after which the resulting metallic chemical compound is allowed to percolate or filter through suitable material which acts as a strainer, and then is finally led into a second vessel where the metal is precipitated from the chemical compound by contact with iron plates.

Further objects and advantages of this invention are hereinafter more fully brought out in the following specification when read in connection with the accompanying drawings, in which:—

Figure 1 is a transverse sectional view of the filtering vessel; and Fig. 2 is a similar view of the precipitating vessel.

Referring to the drawings, and particularly to Fig. 1 thereof, a tank 1 of a suitable material, not acted upon by the fluid 2 contained therein, is divided into compartments 3 and 4 by partition 5, which extends from the top to within a short distance of the bottom thus leaving a passageway 6 whereby one compartment communicates with the other.

For draining the compartment 3 a tap 7 is provided, adjacent to the bottom thereof, while the compartment 4 may be partially drained by a tap 8, or completely by a tap 9, a third tap 10 also being provided adjacent to the top of said latter compartment, through which the metal laden solution is allowed to pass into the second tank 15, shown in Fig. 2.

The tank 15, similarly to the tank 1, is made of a suitable substance not attacked by any solution contained therein, while for draining said tank there is provided a tap 16 adjacent to the bottom thereof. Across the top of this latter tank or vessel extend any suitable means 17, provided with suitable devices 18 such as rings, for suspending therefrom plates 19, preferably of iron.

For carrying out the process with my improved apparatus, the bottom of the compartment 3 in the tank 1 is closely strewn with coarse gravel 20 upon which is placed a layer of finer gravel 21, while the bottom of compartment 4 is covered first with a layer of mediumly coarse gravel 22, then with fine gravel 23, and finally a relatively thick layer of clean sand 24, which extends upwardly to a point immediately below the outlet leading to the tap 8.

The complete process is as follows: Copper laden ore is placed in the compartment 3 of the tank 1 and with it suitable chemicals preferably consisting of copper sulfate, nitrate of soda, salt and water. And, while I do not limit myself to any exact proportions of these elements, I prefer to use them in the following relative amounts—for 2000 pounds of ore, 26 pounds of copper or cupric sulfate, 24 pounds of nitrate of soda, and 35 pounds of salt with sufficient water added to form the whole into a slime. This slime is allowed to slowly filter through the gravel at the bottom of the compartment, thence through the communicating passageway 6 and upwardly through the gravel and sand in compartment 4, which action strains the liquid so that the resulting fluid is perfectly clear and free from all suspended foreign matter. From the compartment 4 in said tank 1 the liquid is allowed to enter and substantially fill the tank 15, thus surrounding the iron plates 19. Here said liquid stands the required length of time, during which the only separatory action is the occasional swinging of the plates 19 to and fro to shake or wash from the surfaces thereof copper which has accumulated thereon. The result of the suspension of the iron plates in the liquid is the precipitation of pure copper upon the bottom of the tank 15 and from which it can be readily removed in any suitable manner. After the complete separatory action has taken place, the liquid freed from the copper previously contained therein is drawn from the tank through the tap 16.

I claim:—

An apparatus for treating ores comprising a tank of oblong rectangular form subdivided by a vertical partition into separate and independent primary and secondary compartments, the lower edge of said partition being slightly spaced from the bottom of the tank to provide a constricted passage way between said compartments, the primary compartment being of greater internal area than the secondary compartment, filtering media in the bottom of said primary compartment and composed of layers of comminuted filtering material of gradually increasing degrees of fineness and terminating slightly above the level of said passage way, filtering media in the bottom of the secondary compartment consisting of layers of comminuted filtering material extending upwardly within said compartment to a point above the level of the passage way and also above the level of the filtering media in the primary compartment and gradually increasing in degrees of fineness, discharge faucets communicating with said compartments immediately above the level of the respective beds of filtering materials therein, a discharge faucet communicating with the secondary compartment below the level of the filtering material therein, and a discharge faucet communicating with the second compartment at a point in line with the designated level of the filtrate.

In testimony whereof I affix my signature in presence of two witnesses.

WILLIAM A. HOFFMAN.

Witnesses:
JOHN WILHELM,
STEWART MACFARLANE.

Copies of this patent may be obtained for five cents each, by addressing the "Commissioner of Patents, Washington, D. C."